United States Patent
Bisaka et al.

(10) Patent No.: US 6,645,659 B2
(45) Date of Patent: Nov. 11, 2003

(54) FUEL CELL APPARATUS

(75) Inventors: Toru Bisaka, Kariya (JP); Hiroaki Nishiumi, Toyota (JP); Hideyuki Tanaka, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 229 days.

(21) Appl. No.: 09/907,804

(22) Filed: Jul. 19, 2001

(65) Prior Publication Data

US 2002/0034673 A1 Mar. 21, 2002

(30) Foreign Application Priority Data

Jul. 19, 2000 (JP) .................................. 2000-218280
Aug. 7, 2000 (JP) .................................. 2000-238300
Jun. 4, 2001 (JP) .................................. 2001-167540

(51) Int. Cl.⁷ .............................................. H01M 2/08
(52) U.S. Cl. .............................. 429/37; 429/38; 429/35
(58) Field of Search ................... 429/37, 35, 34, 429/12, 38

(56) References Cited

U.S. PATENT DOCUMENTS

| 4,692,391 A | * | 9/1987 | Hirota | 429/34 |
| 5,484,666 A | * | 1/1996 | Gibb et al. | 429/34 |
| 6,190,793 B1 | * | 2/2001 | Barton et al. | 429/34 |
| 6,210,823 B1 | * | 4/2001 | Hatoh et al. | 429/30 |

FOREIGN PATENT DOCUMENTS

| JP | 61058158 A | 3/1986 |
| JP | 03109127 A | 5/1991 |
| JP | 08192639 A | 7/1996 |
| JP | 09/139223 | 5/1997 |
| JP | 09/259916 | 10/1997 |

* cited by examiner

*Primary Examiner*—Patrick Ryan
*Assistant Examiner*—Raymond Alejandro
(74) *Attorney, Agent, or Firm*—Pillsbury Winthrop LLP

(57) ABSTRACT

A fuel cell apparatus includes a stack of fuel cells, first and second end plates disposed at opposite ends of the stack of fuel cells to press the stack of fuel cells and being connected by a fastening member, and a pressure plate disposed inboard of the first end plate. A concave portion is formed at an inboard surface of the first end plate and a convex portion is formed at an outboard surface of the pressure plate. The convex portion contacts the concave portion. The first and second end plates are coupled to the fastening member (or, a tension plate) by a serration and a bolt. An adjusting portion is formed in the first end plate, and the concave portion is formed in the adjusting portion. A load variance decreasing mechanism is disposed in series with the contact portion of the convex portion and the concave portion. A recess is formed in an electrical insulator disposed inboard of the pressure plate, and the pressure plate is disposed in the recess. The convex portion may include a spherical surface or a cylindrical surface. The load variance decreasing mechanism may include a plurality of sets of coned disk springs disposed in series with each other. The fuel cell apparatus may include an attaching member constituting a portion of the fuel cell apparatus and attaching the fuel cell apparatus to a vehicle.

20 Claims, 10 Drawing Sheets

ELECTRICAL INSULATION DISTANCE

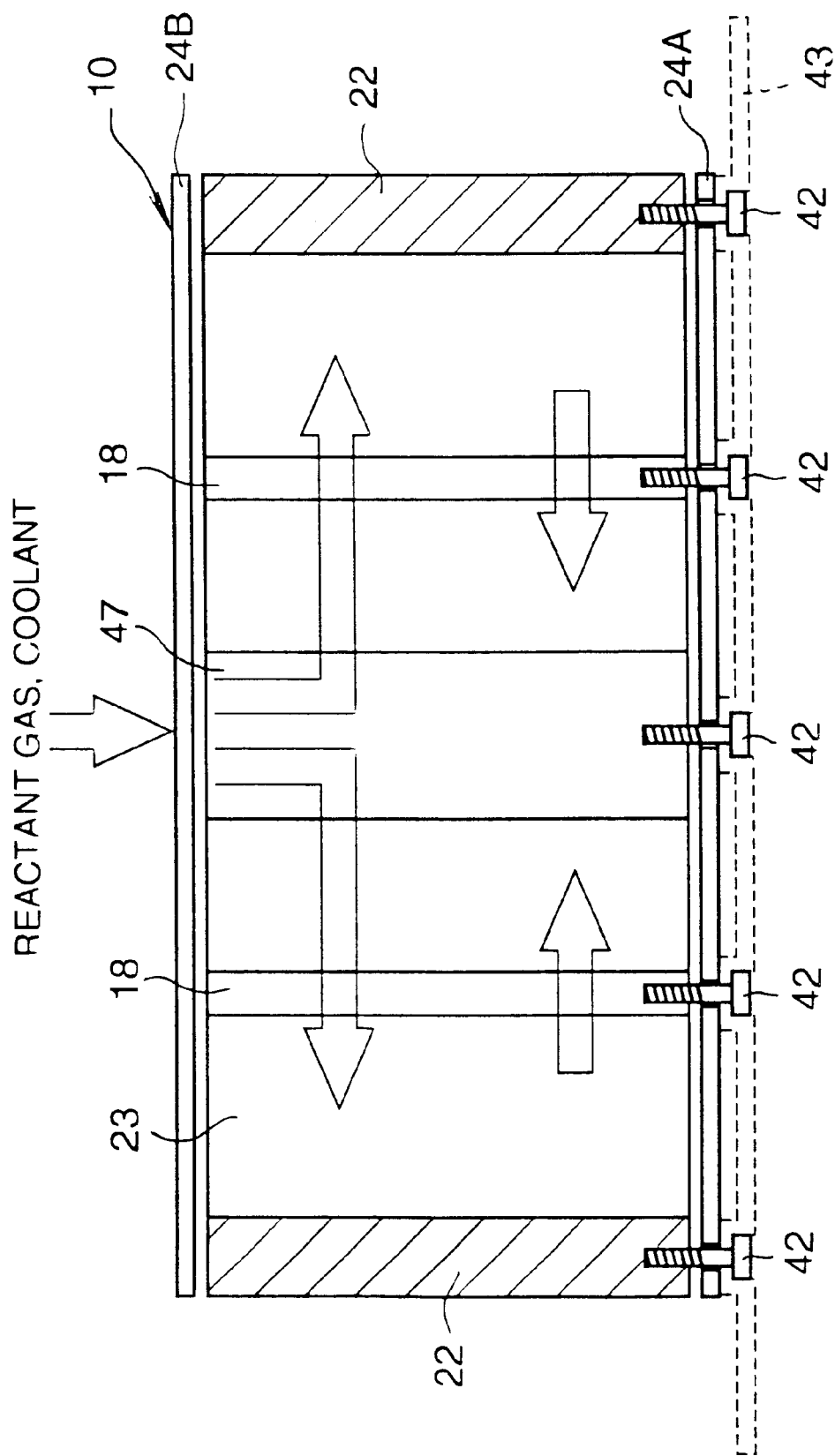

FUEL CELL APPARATUS

This application is based on and claims priority from Japanese Patent Application Nos. 2000-218280, 2000-238300 and 2001-167540 filed on Jul. 19, 2000, Aug. 7, 2000 and Jun. 4, 2001, respectively, the contents of which are incorporated herein by reference.

BACKGROUND OF THE INVENTION

1. Field of the Invention

The present invention relates to a fuel cell apparatus or a fuel cell stack.

2. Description of Related Art

A PEFC (Polymer Electrolyte Fuel Cell) apparatus includes a stack of fuel cells. Each fuel cell includes a membrane-electrode assembly (MEA) and a separator. The MEA includes an electrolyte membrane and a pair of electrodes disposed on opposite sides of the electrolyte membrane. The pair of electrodes include a fuel electrode (anode) constructed of a first catalyst layer with a first diffusion layer and an oxidant electrode (cathode) constructed of a second catalyst layer with a second diffusion layer. The separator has a passage formed therein for supplying fuel gas (hydrogen) to the anode and for supplying oxidant gas (oxygen, usually, air) to the cathode. A plurality of fuel cells are formed to construct a piled module. Electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to the fastening member (or a tension plate) extending in a fuel cell stacking direction outside the pile of fuel cells by bolts extending perpendicularly to the fuel cell stacking direction.

In the PEFC, at the anode, hydrogen is changed to positively charged hydrogen ions and electrons. The hydrogen ions move through the electrolyte to the cathode where the hydrogen ions react with oxygen supplied and electrons (which are generated at an anode of the adjacent MEA and move to the cathode of the instant MEA through a separator) to form water as follows:

At the anode: 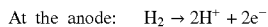

At the cathode: 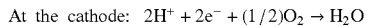

A cooling passage is formed at all of the modules, so that the fuel cell apparatus is cooled by a coolant (usually, water) flowing through the cooling passage. As a result, the temperature of the fuel cells is controlled by the temperature between the environmental temperature (about 20° C.) and the operating temperature (about 80° C.).

In order that the above electrical-chemical reaction is normally conducted, pressure acting on the stack of fuel cells is required to be evenly distributed and be maintained constant over a whole fuel cell face despite the above changing temperature.

Japanese Patent Publication HEI 9-259916 discloses a structure for tightening the stack of fuel cells using four rods extending outside of the stack of fuel cells. Nuts are then threaded to the end of the rods in order to tighten the stack of fuel cells, in order to provide evenly distributed pressure. A coil spring is disposed between the nut and the stack of fuel cells, whereby a variance of the load is decreased.

However, with the conventional tightening structure, there is a problem that it is difficult to tighten the stack of fuel cells with an evenly distributed pressure if the fuel cells are not parallel with each other, resulting that the power characteristic of the fuel cell decreases and in a worst case, leakage of the reactant gas (hydrogen, air) occurs. Further, with the tightening structure using four rods, the rod further extends outwardly from the end plate, and the fuel cell apparatus is too long so that the mounting of the fuel cell apparatus to a vehicle is not easy.

SUMMARY OF THE INVENTION

An object of the present invention is to provide a fuel cell apparatus which can tighten a stack of fuel cells in a fuel cell stacking direction with an evenly distributed pressure.

Another object of the present invention is to provide a fuel cell apparatus with improved attaching capabilities to a vehicle.

A fuel cell apparatus according to the present invention includes a stack of fuel cells having a fuel cell stacking direction and a first end and a second, opposite end in the fuel cell stacking direction. First and second end plates are disposed on the first end and the second end of the stack of fuel cells. The first and second end plates pressing the stack of fuel cells therebetween, and are coupled to a fastening member extending in the fuel cell stacking direction outside the stack of fuel cells. The first end plate having an inboard surface facing said stack of fuel cells. A pressure plate disposed on a side of the first end of the stack of fuel cells and inboard of the first end plate, the pressure plate having an outboard surface facing the first end plate. The first end plate has a concave portion formed in the first end plate at the inboard surface of the first end plate. The pressure plate has a convex portion having a curved surface formed in the pressure plate at the outboard surface of the pressure plate. The convex portion contacts the concave portion.

Each of the first and second end plates may be coupled to the fastening member by a serration and a bolt. The first end plate may include an end plate main portion and an adjusting portion adjustable in a position relative to the end plate main portion in the fuel cell stacking direction. The concave portion may be formed in the adjusting portion.

A load variance decreasing mechanism may be disposed at at least one position of in the first end plate, in the pressure plate, and between the pressure plate and the first end plate, and in series with contact portion of the convex portion with the concave portion in a tightening force transmitting direction.

An electrical insulator may be disposed inboard of the pressure plate. The electrical insulator may have an outboard surface and a recess formed in the electrical insulator at the outboard surface of the electrical insulator. The pressure plate may be disposed in the recess of the electrical insulator.

The curved surface of the convex portion may comprise a spherical surface. In a case where the fuel cells are restricted in dislocation in one of two directions perpendicular to the fuel cell stacking direction by the fastening member, the curved surface of the convex portion may comprise a cylindrical surface curved in the other direction of the two directions in which the fuel cells are not restricted in dislocation by the fastening member.

The load variance decreasing mechanism may comprise a plurality of sets of coned disk springs, disposed in series with each other. The first end plate may include an end plate main portion and an adjusting portion adjustable in position relative to the end plate main portion in the fuel cell stacking direction. At least one portion of the load variance decreasing mechanism may be disposed between the end plate main portion and the adjusting portion. The adjusting portion may include a female thread portion restricted in rotation relative to the end plate main portion and a male thread portion threaded to the female thread portion and adjustable in position relative to the female thread portion in an axial direction of the male thread portion.

The pressure plate may be divided into two members in the fuel cell stacking direction, and at least one portion of the load variance decreasing mechanism may be disposed between the two members of the pressure plate.

The pressure plate may be divided into two members including an outboard member and an inboard member in the fuel cell stacking direction. The outboard member has the convex portion formed therein and a load sensor provided therein. The pressure plate may include an outside surface having a height in the fuel cell stacking direction smaller than a height of an inside surface in the fuel cell stacking direction of the recess formed in the electrical insulator.

The load variance decreasing mechanism may include at least one set of coned disk springs which is reversed in taper angle when a fuel cell stacking force acts on the at least one set of coned disk springs.

At least one pair of spring seats may be provided to the pressure plate and the end plate, for contacting and supporting the at least one set of coned disk springs at a radially inner end and a radially outer end of the at least one set of coned disk springs. Each pair of spring seats may be inclined at an angle equal to or greater than the taper angle of corresponding set of coned disk springs reversed in taper angle.

The fuel cell apparatus may include an attaching member for attaching the fuel cell apparatus to a vehicle to which the fuel cell apparatus is mounted. The attaching member may be constructed of a portion of the fuel cell apparatus itself. The attaching member may be the fastening member connecting the first and second end plates. The attaching member may have a attaching portion protruding in a direction away from the stack of fuel cells and in a direction perpendicular to the fuel cell stacking direction. The attaching member may be attached to the vehicle at the attaching portion.

The stack of fuel cells may have a recess receding from a surface of the stack of fuel cells in a direction perpendicular to the fuel cell stacking direction, and the attaching member may have an attaching portion at a position corresponding to the recess. The attaching member is attached to the vehicle at the attaching portion. The attaching member may be any one of the first and second end plates and a separator of a fuel cell. The attaching member may be a member for supplying reactant gas or coolant to the fuel cell apparatus.

With the above fuel cell apparatus according to the present invention, since the end plate and the pressure plate is pressed to each other at the contact portion of the convex portion and the concave portion, even if the fuel cells are not parallel with each other, the end plate can press at a point the pressure plate at the contact portion of the convex portion and the concave portion so that the pressure plate can press the stack of the fuel cells at an evenly distributed pressure over the entire transverse cross-sectional area of the stack of fuel cells. Further, since the convex portion is formed in the pressure plate, the variance in parallel between fuel cells can be absorbed by a rotation or tilting of the pressure plate about the center of curvature of the curved surface of the convex portion without being accompanied by dislocation of the fuel cells in a direction perpendicular to the fuel cell stacking direction. Further, since the concave portion is formed in the end plate, the convex portion and the concave portion do not dislocate relative to each other in the transverse direction perpendicular to the fuel cell stack direction and the coupling is stable.

Further, in a case where the stack attaching member is constructed of a portion of the fuel cell stack itself, it is not necessary to provide an extra attaching member used only for attaching the stack of fuel cells to a vehicle, so that attaching the stack of fuel cells to the vehicle by a small number of attaching members becomes possible.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 25 is a cross-sectional view of a fuel cell apparatus according to a sixth embodiment of the present invention, seen in a fuel cell stacking direction.

DETAILED DESCRIPTION OF THE PREFERRED EMBODIMENTS

Figure 22:
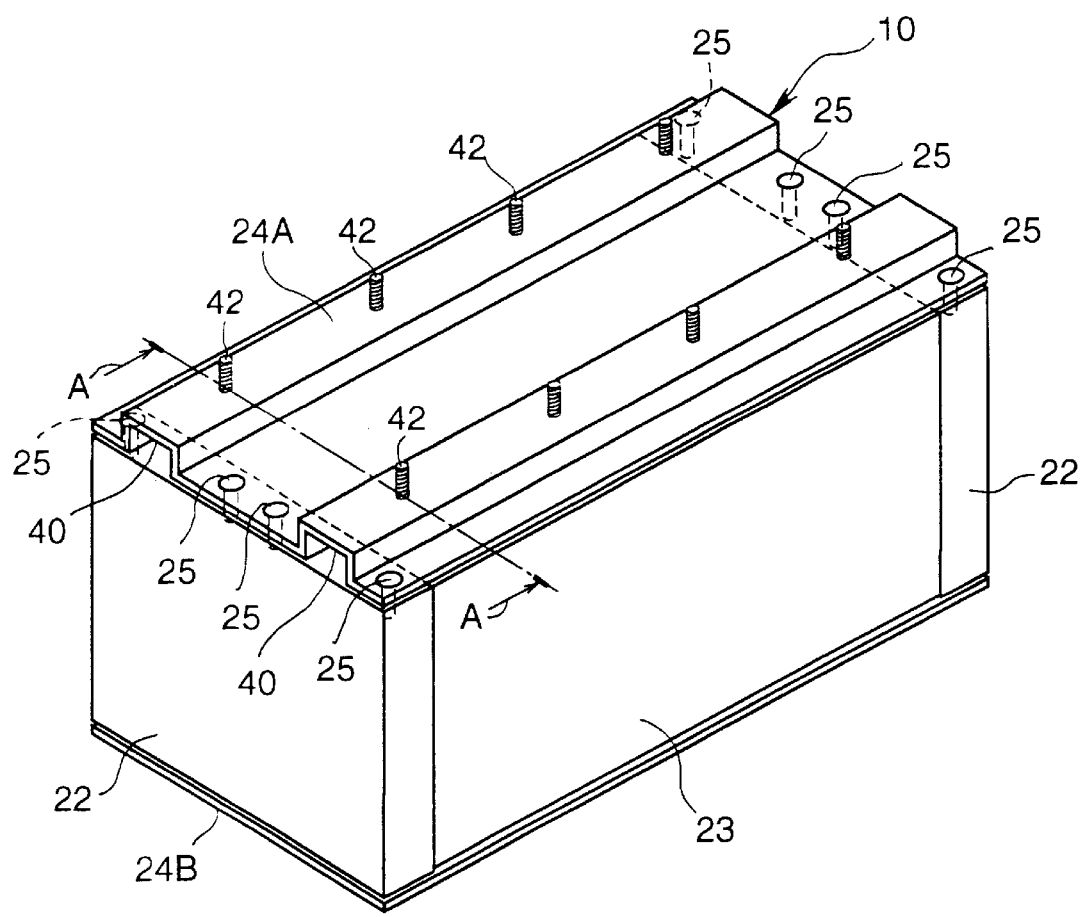
FIG. 22 is a schematic perspective view of a fuel cell apparatus according to a fourth embodiment of the present invention.
Figure 23:
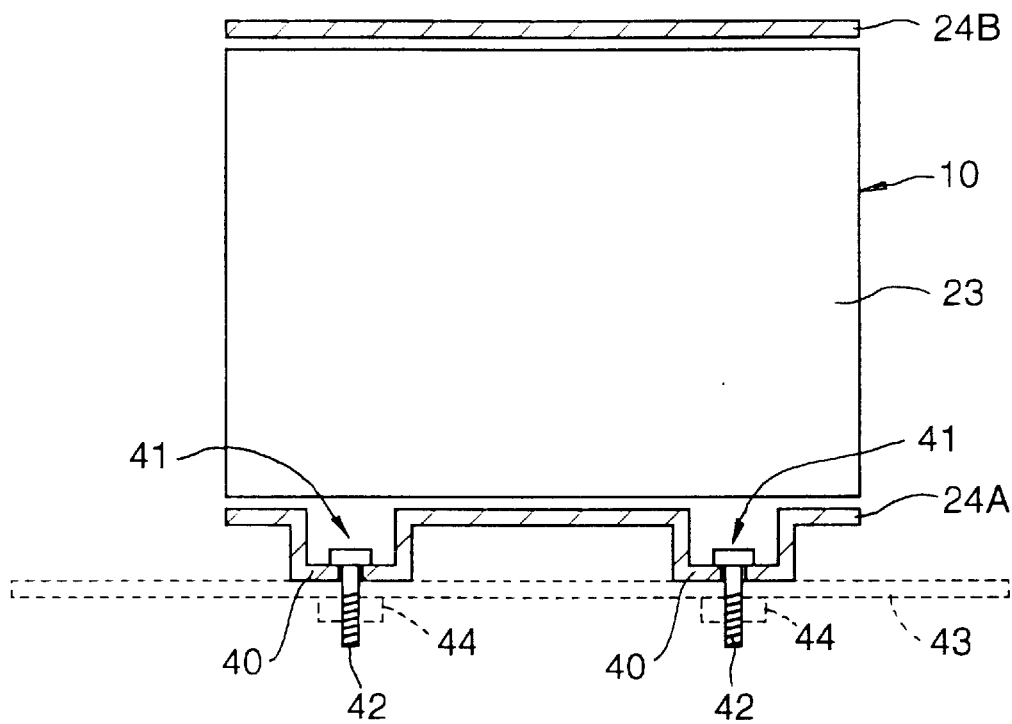
FIG. 23 is a cross-sectional view of the fuel cell apparatus, seen in an upside-down direction on line A—A of FIG. 22.
Figure 24:
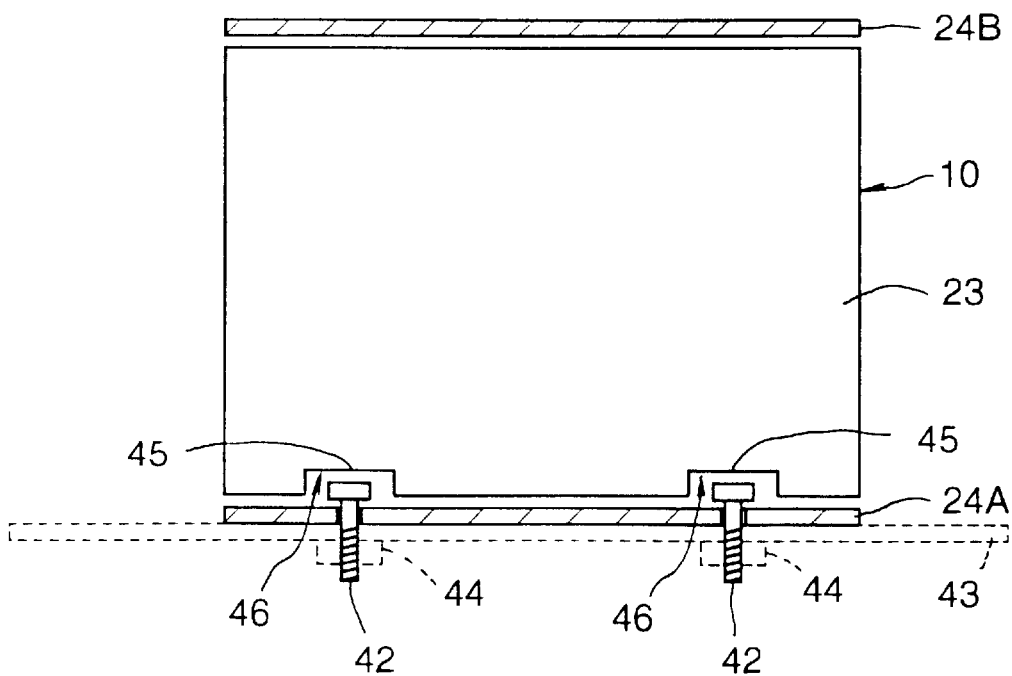
FIG. 24 is a cross-sectional view of a fuel cell apparatus according to a fifth embodiment of the present invention, seen in a direction perpendicular to a fuel cell stacking direction.

FIGS. 1–15 illustrate a fuel cell apparatus according to a first embodiment of the present invention; FIGS 16 illustrates a fuel cell apparatus according to a second embodiment of the present invention; FIGS. 17–21 illustrate a fuel cell apparatus according to a third embodiment of the present invention; FIGS. 22 and 23 illustrate a fuel cell apparatus according to a fourth embodiment of the present invention; FIG. 24 illustrates a fuel cell apparatus according to a fifth embodiment of the present invention; and FIG. 25 illustrates a fuel cell apparatus according to a sixth embodiment of the present invention.

Portions common or similar to each other throughout all of the embodiments of the present invention are denoted with the same reference numerals throughout all of the embodiments of the present invention.

Firstly, portions common to or similar to each other throughout all of the embodiments of the present invention will be explained referring to FIGS. 1–15.

A fuel cell apparatus according to the present invention is a polymer electrolyte fuel cell (hereinafter, PEFC) apparatus which is mounted to, for example, a vehicle. However, the PEFC apparatus may be used for other than a vehicle.

Figure 1:
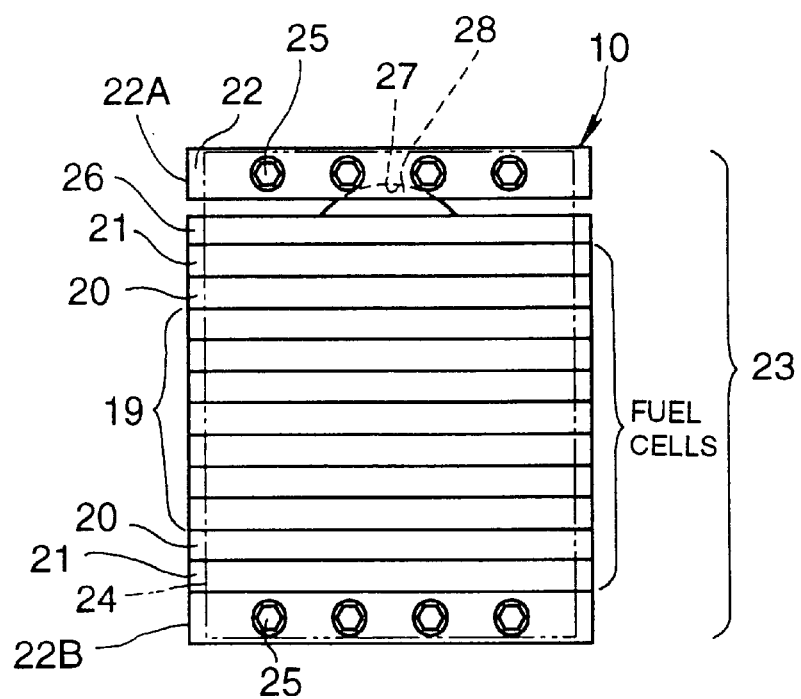
FIG. 1 is a front view of a fuel cell apparatus according to a first embodiment of the present invention.
Figure 2:
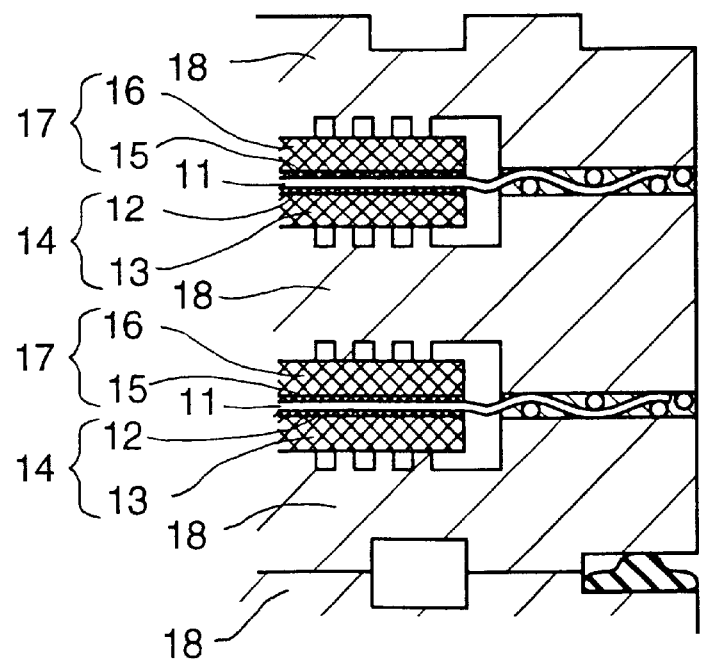
FIG. 2 is an enlarged cross-sectional view of a portion of the fuel cell apparatus according to the first embodiment of the present invention.

As illustrated in FIGS. 1 and 2, the PEFC (Polymer Electrolyte Fuel Cell) apparatus 10 includes at least one stack of individual fuel cells 23. Each fuel cell includes a membrane-electrode assembly (MEA) and a separator 18. The MEA includes an electrolyte membrane 11 and a pair of electrodes disposed on opposite sides of the membrane 11. The pair of electrodes include an anode 14 provided on one side of the membrane 11 and constructed of a first catalyst layer 12 and a first diffusion layer 13, and a cathode 17 provided on the other side of the membrane 11 and constructed of a second catalyst layer 15 and a second diffusion layer 16. The separator 18 has a passage formed therein for supplying fuel gas (hydrogen) to the anode 14 and oxidant gas (oxygen, usually, air) to the cathode 17. A plurality of fuel cells (for example, two fuel cells) are piled to construct a module 19. A number of modules are piled, and electrical terminals 20, electrical insulators 21, and end plates 22 are disposed at opposite ends of the pile of modules to construct a stack of fuel cells 23. After tightening the stack of fuel cells 23 between the opposite end plates 22 in a fuel cell stacking direction, the opposite end plates 22 are coupled to the fastening member 24 (for example, a tension plate) extending in a fuel cell stacking direction outside the pile of modules by bolts 25 extending perpendicularly to the fuel cell stacking direction. The fastening member 24 constitutes a portion of the stack of fuel cells 23. The tension plate may be replaced by a through-bolt and nut.

As illustrated in FIGS. 1–6, a pressure plate 26 is disposed inboard of a first end plate 22A disposed at a first end of the stack of fuel cells 23 in the fuel cell stacking direction. A pressure plate is not provided inboard of a second end plate 22B disposed at a second, opposite end of the stack of fuel cells 23.

Figure 3:
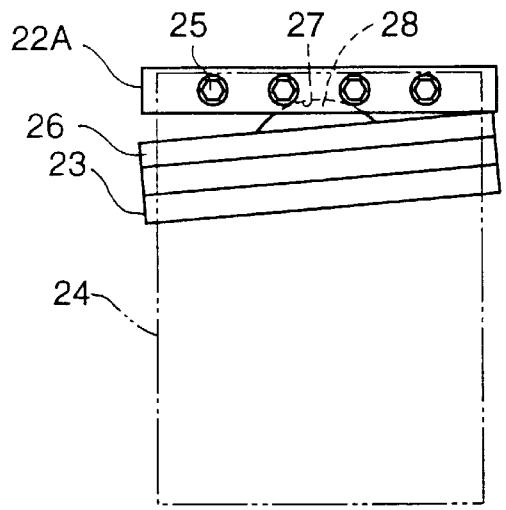
FIG. 3 is a front view of a portion of the fuel cell apparatus according to the first embodiment of the present invention, in a case where fuel cells are inclined.

A concave portion 27 is formed in the first end plate 22A at an inboard surface of the first end plate 22A facing the pressure plate 26. In a case where the end plate 22 is divided into an end plate main portion 22a and an adjusting portion 22b, the concave portion 27 is formed in either one of the end plate main portion 22a and the adjusting portion 22b. A convex portion 28 having a curved surface is formed in the pressure plate 26 at an outboard surface of the pressure plate 26. In a case where the pressure plate 26 is divided into two members, i.e., an inboard member 26a and an outboard member 26b in a fuel cell stacking direction, the convex portion 28 is formed in either one of the two members. The curved surface of the convex portion 28 is a spherical surface or a cylindrical surface. The convex portion 28 is pressed to the concave portion 27. At this state, the end plates 22 of the stack of fuel cells are coupled to the tension plate 24 extending in the fuel cell stacking direction outside the pile of fuel cells. A gap exists between the inboard surface except the concave portion 27 of the end plate 22A and the outboard surface except the convex portion 28 of the pressure plate 26, so that the pressure plate 26 can tilt relative to the end plate 22 within angles where the pressure plate 26 begins to contact the end plate 22A as illustrated in FIG. 3. In order that the pressure plate 26 can smoothly tilt relative to the end plate 22A, a surface of the convex portion 28 and the concave portion 27 is coated with grease.

Figure 6:
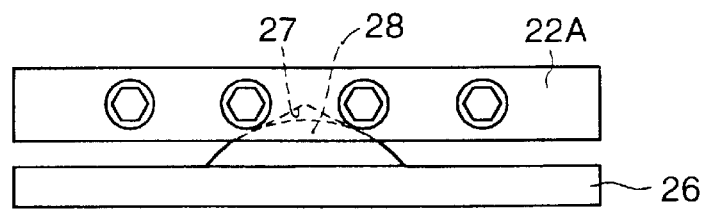
FIG. 6 is a front view of a portion of the fuel cell apparatus according to the first embodiment of the present invention, in a case where a concave portion is constructed of a concave non-spherical surface.

The surface of the concave portion 27 may be constructed of a concave spherical surface, or of a concave non-spherical surface, for example, a concave cone surface as illustrated in FIG. 6. In the case of a concave cone surface, the concave portion 27 can well hold the grease.

Figure 4:
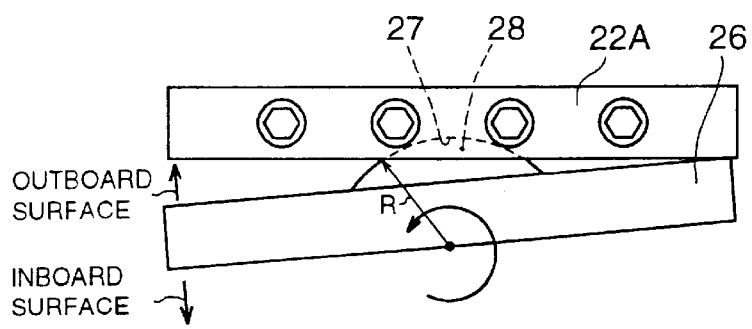
FIG. 4 is a front view of a portion of the fuel cell apparatus according to the first embodiment of the present invention, illustrating a rotational center of a pressure plate.
Figure 5:
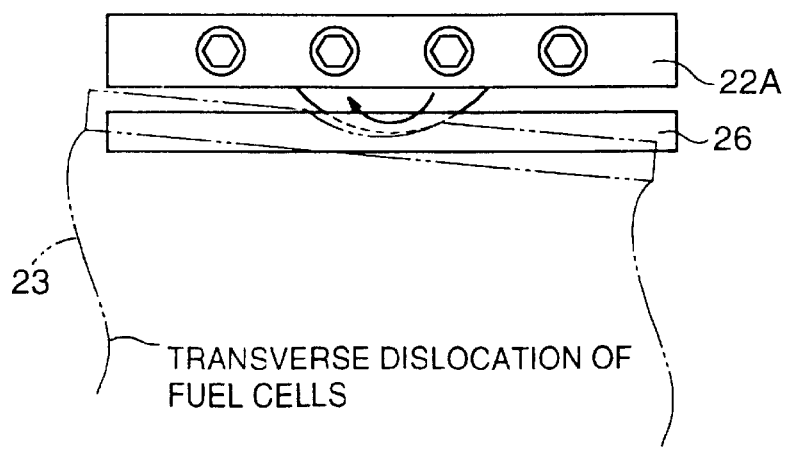
FIG. 5 is a front view of a portion of a fuel cell apparatus according to a comparison example with the first embodiment of the present invention, illustrating a rotational center of a pressure plate.

As illustrated in FIG. 4, a center of curvature of the spherical or cylindrical surface of the convex portion 28 is located at the inboard surface of the pressure plate 26 or at the vicinity thereof.

Since the end plate 22 and the pressure plate 26 contacts each other at the contact portion of the convex portion 28 and the concave portion 27, even if the fuel cells incline, the pressure plate 26 inclines according to the inclination of the fuel cells and can evenly press the fuel cells at the entire transverse area thereof.

Further, since the convex portion 28 is provided on the pressure plate side, even if the fuel cells incline, the inclination of the fuel cells can absorbed by rotation of the convex portion 28 only without being accompanied by any dislocation of the fuel cells in the direction perpendicular to the fuel cell stacking direction. If the convex portion were provided on the end plate side, the center of curvature of spherical surface of the convex portion would be near the outboard surface of the end plate, so that when the pressure plate rotates about the center of curvature of the convex portion, the pressure plate will cause a transverse dislocation by an amount equal to the product of the rotational angle and the distance between the pressure plate and the center of curvature of the convex portion. Contrarily, in the present invention where the convex portion 28 is provided on the pressure plate side, the fuel cells do not cause a transverse dislocation when the pressure plate 26 rotates about the center of curvature of the convex portion 28.

Further, owing to the contact structure of the convex portion 28 and the concave portion 27, the convex portion 28 and the concave portion 27 do not dislocate to each other in the perpendicular direction of the fuel cell stacking direction. As a result, a stable tightening is obtained.

As illustrated in FIGS. 7–10, each of the first and second end plates 22A and 22B is coupled to the fastening member, i.e., the tension plate 24 by a serration 29 and a bolt (which includes a screw) 25. The bolt 25 extends in the direction perpendicular to the fuel cell stacking direction. Teeth of the serration 29 are formed in the end plate 22 and the tension plate 24 at the contact surfaces thereof. The teeth of the serration 29 extend in the direction perpendicular to the fuel cell stacking direction. The teeth of the serration 29 may have a triangular cross section or a rectangular cross section. The cross section of the teeth may be of any other shape. Owing to the teeth coupling structure, the end plate 22 and the tension plate 24 do not cause any slippage relative to each other in the fuel cell stacking direction.

Figure 8:
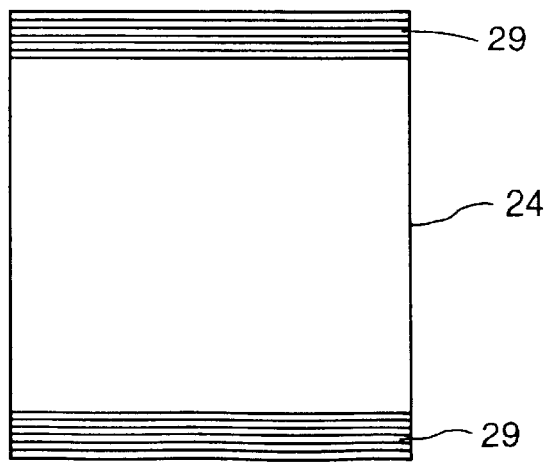
FIG. 8 is a front view of a tension plate (single-type) of the fuel cell apparatus according to the first embodiment of the present invention.
Figure 9:
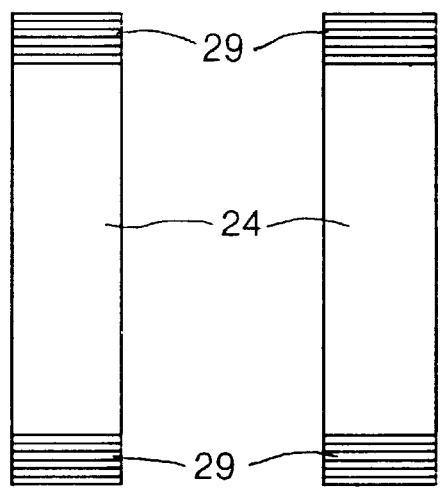
FIG. 9 is a front view of a tension plate (multi-type) of the fuel cell apparatus according to the first embodiment of the present invention.
Figure 10:
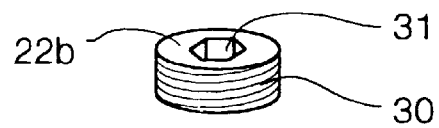
FIG. 10 is a perspective view of an adjusting portion of the fuel cell according to the first embodiment of the present invention.

The tension plate 24 may be provided by one on each side of the stack of fuel cells, as illustrated in FIG. 8. A plurality of tension plates 24 may be provided on each side of the stack of fuel cells, as illustrated in FIG. 9.

In the case where the coupling structure between the end plate 22 and the tension plate 24 is constructed of the serration 29 and the bolt 25, a positional adjustment of an amount smaller than a pitch of the teeth of the serration is impossible. As a result, a load adjustment is limited. To enable any amount of positional adjustment and load adjustment, the first end plate 22A, which is rectangular, at the first end of the stack of fuel cells includes an end plate main portion 22a and an adjusting portion 22b which is separate from the end plate main portion 22a and adjustable in position relative to the end plate main portion 22a in the fuel cell stacking direction. The concave portion 27 is formed in the adjusting portion 22b.

Figure 7:
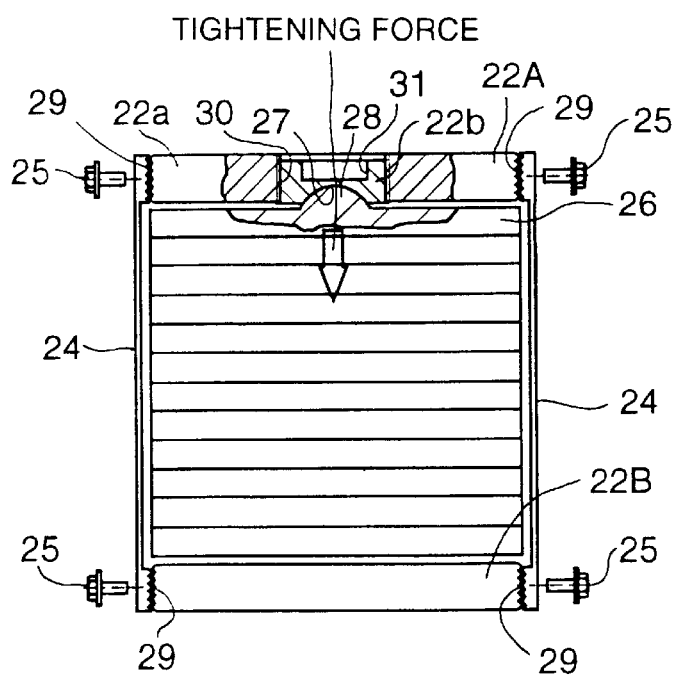
FIG. 7 is a side view, partially illustrated in cross-section, of the fuel cell apparatus according to the first embodiment of the present invention, in a case where opposite end plates are coupled to a fastening member by a serration and a bolt.
Figure 17:
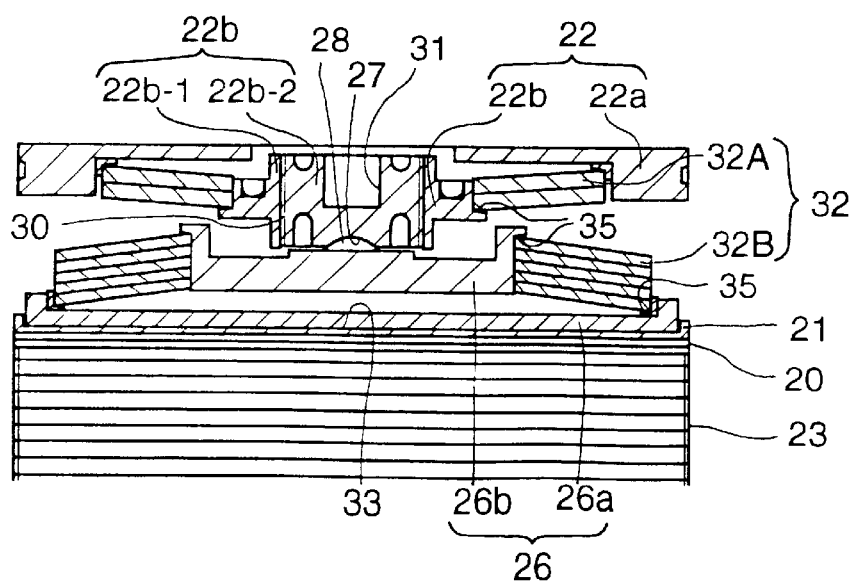
FIG. 17 is a cross-sectional view of a portion of a fuel cell apparatus according to a third embodiment of the present invention, in a state that no tightening load acts thereon
Figure 18:
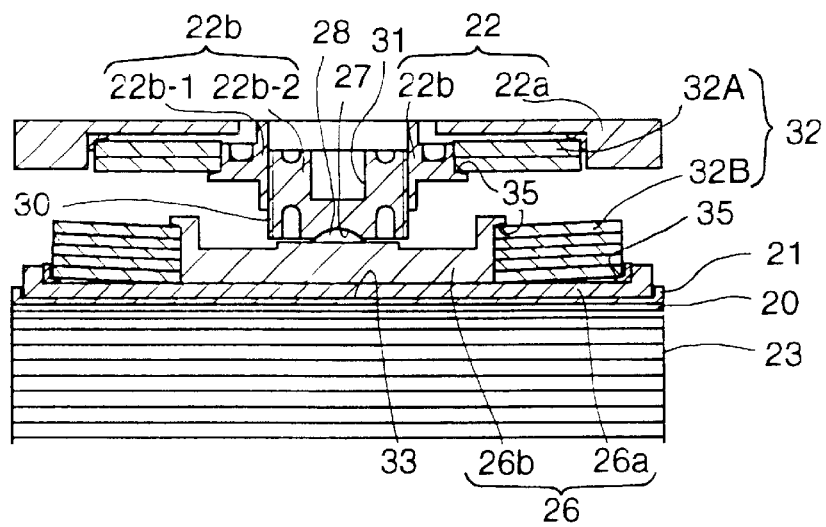
FIG. 18 is a cross-sectional view of a portion of the fuel cell apparatus according to the third embodiment of the present invention, in a state that tapered angles of coned disk springs are reversed when the tightening load acts thereon.
Figure 19:
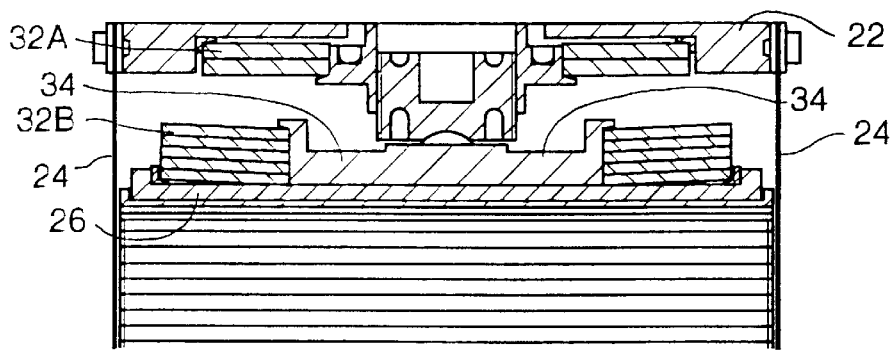
FIG. 19 is a cross-sectional view a portion of the fuel cell apparatus including a tension plate, according to the third embodiment of the present invention, in a state that the tapered angles of coned disk springs are reversed when the tightening load acts thereon.
Figure 20:
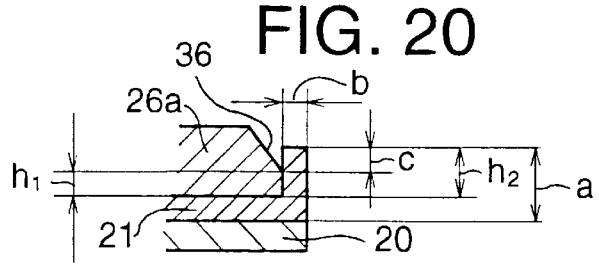
FIG. 20 is a cross-sectional view of a portion of the fuel cell apparatus according to the third embodiment of the present invention, illustrating an outer portion of a pressure plate and the vicinity thereof.

The adjusting portion 22b may be constructed of a single member as illustrated in FIG. 7, or may be constructed of two members as illustrated in FIG. 17. In the case of the adjustment portion 22b of FIG. 7, the adjustment portion 22b has a male thread 30 and is threaded to a penetration hole with a female thread formed in a central portion of the end plate main portion 22a. In the case of the adjustment portion 22b of FIG. 17, the adjustment portion 22b includes two members: a female thread portion 22b-1 and a male thread portion 22b-2 which are threaded to each other at the thread 30. The concave portion 27 is formed in the male thread portion 22b-2.

A groove having a polygonal (for example, hexagonal) transverse cross section for receiving a driver for rotation therein is formed in an outboard portion of the adjustment portion 22b (in the case of the two member adjustment portion, the male thread portion 22b-2 of the adjustment portion 22b). By rotating the adjustment portion about a rotational axis thereof, the adjustment portion 22b (in the case of the two member adjustment portion, the male thread portion 22b-2 of the adjustment portion 22b) is adjusted in position relative to the end plate main portion 22a in the fuel cell stacking direction.

With an effect of the coupling structure by the serration and the bolt, if the serration were not provided, a bolt having a large diameter would be necessary in order to cause a large frictional force at the contact surface between the end plate and the tension plate and to prevent any slippage from occurring between the end plate and the tension plate. In contrast, in the case of the serration coupling, since a coupling force between the end plate 22 and tension plate 24 can be decreased, the necessary diameter of the bolt 25 becomes small, so that a diameter of a thread hole formed in the end plate 22 is small. As a result, a thickness of the end plate 22 can be small, and an entire length of the stack of the fuel cells can be decreased. Owing to the serration coupling, the first end plate 22A and the second, opposite end plate 22B can be parallel to each other.

Further, since the adjusting portion 22b or the male thread portion 22b-1 is rotated by inserting a driver into the polygonal groove 31 and rotating the driver, the adjusting portion 22b or the male thread portion 22b-1 does not protrude outboard from the outboard surface of the end plate, so that the entire length of the stack of the fuel cells 23 is not necessary to be lengthened in the fuel cell stacking direction. As a result, mounting the fuel cell apparatus to a vehicle is easy.

Figure 11:
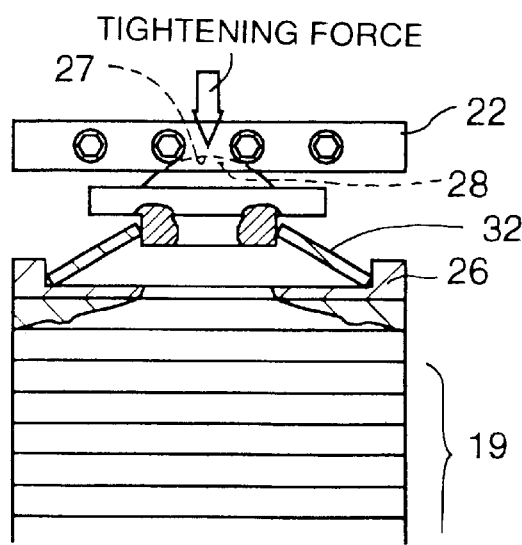
FIG. 11 is a front view, partially illustrated in cross-section, of a portion of the fuel cell apparatus according to the first embodiment of the present invention, illustrating a vicinity of a load variance decreasing mechanism.
Figure 12:
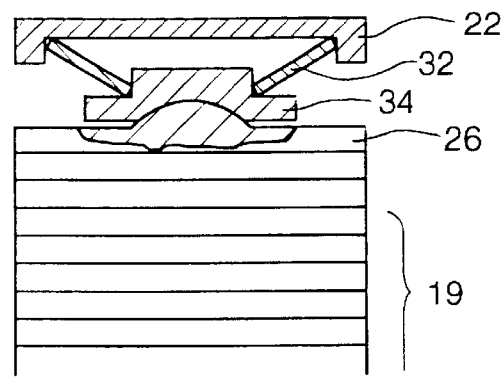
FIG. 12 is a front view, partially illustrated in cross-section, of a portion of the fuel cell apparatus according to the first embodiment of the present invention, in which the arrangement order of a coned disk spring and a contact portion is reversed to that of FIG. 11.

As illustrated in FIGS. 11 and 12, a load variance decreasing mechanism 32 is disposed at at least one position of in the first end plate 22A, in the pressure plate 26, and between the pressure plate 26 and the first end plate 22A, and in series with a contact portion of the convex portion 28 with the concave portion 27 in a tightening force transmitting direction. The load variance decreasing mechanism 32 is constructed of a coned disk spring or a set of coned disk springs having circular inner and outer portions. Owing to the coned disk spring structure, the load variance decreasing mechanism 32 can cause a large force accompanied by a small axial deformation, so that an increase in the entire length of the stack of fuel cells 23 is suppressed.

The load variance decreasing mechanism 32 and the contact portion of the convex portion 28 with the concave portion 27 may be arranged as illustrated in FIG. 11 or as illustrated in FIG. 12. In the case of FIG. 11, they are arranged in the order of contact portion and the load variance decreasing mechanism 32 from the end plate 22 toward the pressure plate 26. In the case of FIG. 12, they are arranged in the order of the load variance decreasing mechanism 32 and the contact portion from the end plate 22 toward the pressure plate 26. Further, as illustrated in FIG. 17, the load variance decreasing mechanism 32 may be constructed of two sets of coned disk springs, and one set may be disposed in the end plate 22 and the other set may be disposed in the pressure plate 26.

The load variance decreasing mechanism 32 is arranged in series with the contact portion of the convex portion 28 with the concave portion 27. When the ambient temperature of the fuel cell apparatus changes due to the cooling and heating cycle of the fuel cell apparatus and when thicknesses of the electrolyte membrane and the anode and cathode change due to a creep thereof, the load variance decreasing mechanism 32 can absorb those changes in the length of the stack of fuel cells, so that a variance in the load imposed on the stack of fuel cells can be suppressed.

Further, owing to the load variance decreasing mechanism 32, the evenly distributed pressure on the fuel cells due to the tilting mechanism by the contact structure of the convex portion 28 with the concave portion is well maintained throughout the entire life of the fuel cell apparatus.

Figure 13:
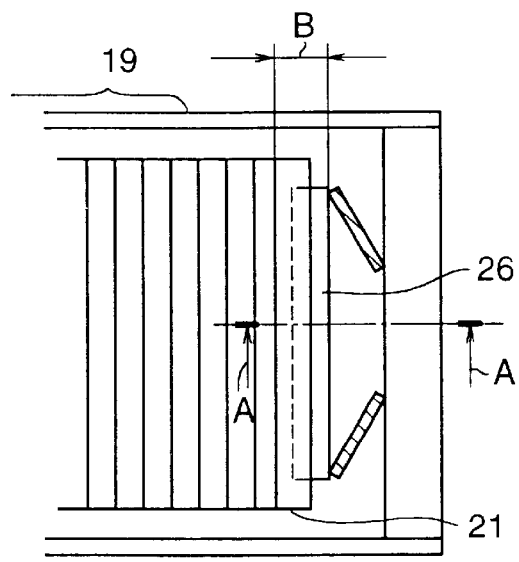
FIG. 13 is a front view of the fuel cell apparatus according to the first embodiment of the present invention, in a case where a recess is formed in an electrical insulator.
Figure 14:
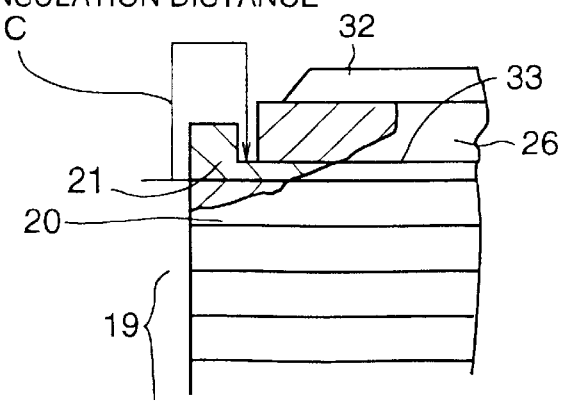
FIG. 14 is a front view, partially illustrated in cross-section, of a portion of the fuel cell apparatus according to the first embodiment of the present invention, illustrating a vicinity of an electrical insulator.
Figure 15:
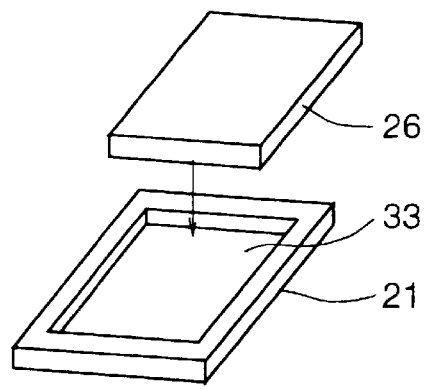
FIG. 15 is an exploded perspective view illustrating the pressure plate and the electrical insulator of the fuel cell apparatus according to the first embodiment of the present invention.
Figure 16:
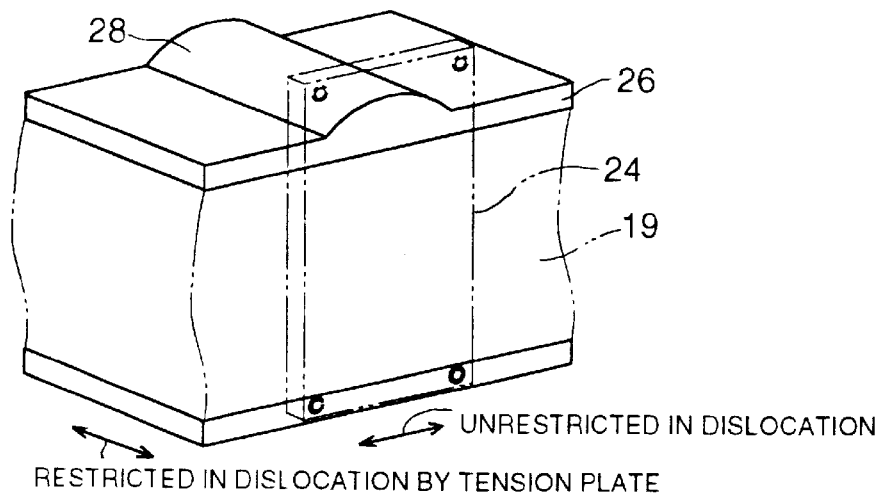
FIG. 16 is a schematic perspective view of a portion of a fuel cell apparatus according to a second embodiment of the present invention.

As illustrated in FIGS. 13–15, the fuel cell apparatus further includes an electrical insulator 21 disposed inboard of the pressure plate 26. The electrical insulator 21 has an outboard surface (pressure side surface) and a recess 33 formed in the electrical insulator 21 at the outboard surface of the electrical insulator 21. The pressure plate 26 is disposed in the recess 33 of the electrical insulator 21.

Due to this recess 33, a distance B between the outboard surface of the pressure plate 26 and the inboard surface of the electrical insulator 21 is smaller than a summation of a thickness of the pressure plate 26 and a thickness of the electrical insulator 21. As a result, the entire length of the stack of fuel cells 23 is shortened.

Further, the electrical insulator 21 is located between the pressure plate 26 and the electrical terminal 20. Since the pressure plate 26 is disposed in the recess 33 and there is a clearance between an outside surface of the pressure plate 26 and an inside surface of a wall of the electrical insulator defining the recess therein, an electrical insulation distance C along a surface of the electrical insulator 21 is increased as compared with an electrical insulation distance (i.e., a thickness of the electrical insulator) of the case where no recess is formed in the electrical insulator.

Similarly, in a case where a recess is formed in the inboard surface (terminal side surface) of the electrical insulator 21 and the electrical terminal 20 is disposed in the recess, the electrical insulation distance between the pressure plate 26 and the electrical terminal 20 is increased.

If such recesses are formed in both of the outboard surface and the inboard surface of the electrical insulator 21, the electrical insulation distance C between the pressure plate 26 and the electrical terminal 20 will be further increased.

Next, portions unique to each embodiment of the present invention will be explained.

In the first embodiment of the present invention, as illustrated in FIGS. 1–15, the convex curved surface of the convex portion 28 is a spherical surface, more exactly, a portion of a spherical surface.

With effects of the spherical surface, even if the fuel cells incline in any direction, the pressure plate 26 can tilt following that inclination of the fuel cells and can press the fuel cells at the entire plane of the fuel cells at an even pressure.

In the second embodiment of the present invention, as illustrated in FIG. 16, in a case where the fuel cells are restricted in dislocation in one of two directions perpendicular to the fuel cell stacking direction by the fastening member 24, the curved surface of the convex portion 28 can be a cylindrical surface curved in the other direction of the two directions in which the fuel cells are not restricted in dislocation by the fastening member 24. In that case, the concave portion 27 formed in the end plate 22 is a cylindrical surface or tapered surfaces for receiving the convex portion 28 therein and contacting the convex portion 28.

The cylindrical surface of the convex portion 28 can operate similarly to the spherical surface in that direction in which the fuel cells are not restricted in dislocation by the fastening member 24. The pressure plate 26 can tilt relative to the end plate, and therefore, the same effect as that of the first embodiment of the present invention is obtained.

In the third embodiment of the present invention, as illustrated in FIGS. 17–21, the load variance decreasing mechanism 32 is constructed of a plurality of sets of coned disk springs 32A and 32B. The plurality of sets of coned disk springs 32A and 32B are disposed in series with each other. Each set of coned disk springs 32A, 32B includes an at least one coned disk springs. In a case where the set of coned disk springs includes a plurality of coned disk springs, the coned disk springs are piled on top of each other.

The contact portion of the convex portion 28 with the concave portion 27 is located between adjacent sets of coned disk springs 32A and 32B. The set of coned disk springs 32A is located on the end plate side of the contact portion of the convex portion 28 with the concave portion 27, and another set of coned disk springs 32B is located on the pressure plate side of the contact portion of the convex portion 28 with the concave portion 27. A smaller diameter end of each of the sets of coned disk springs 32A and 32B is located on the side closer to the contact portion of the convex portion 28 with the concave portion 27, and a larger diameter end of each of the sets of coned disk springs 32A and 32B is located on the side closer to the end plate 22 and the pressure plate 26, respectively.

The load variance decreasing mechanism 32 is constructed of coned disk springs, the coned disk springs can follow and absorb the thermal expansion and shrinkage and deformation due to creep, generated in the stack of fuel cells. Further, in the case where the load variance decreasing mechanism 32 is constructed of a plurality of sets of coned disk springs arranged in series with each other, by arranging the contact portion of the convex portion 28 with the concave portion 27 between the sets of coned disk springs 32A and 32B, the tightening load at the contact portion of the convex portion 28 with the concave portion 27 is radially spread and can be transmitted to both an outer portion of the end plate 22 and an outer portion of the pressure plate 26. This load spreading contributes to the even pressing of the fuel cells.

The first end plate 22A includes an end plate main portion 22a and an adjusting portion 22b adjustable in position relative to the end plate main portion 22a in the fuel cell stacking direction. At least one portion 32A of the load variance decreasing mechanism 32 is disposed between the end plate main portion 22a and the adjusting portion 22b. The adjusting portion 22b includes a female thread portion 22b-1 restricted in rotation relative to the end plate main portion 22a and a male thread portion 22b-2 threaded to the female thread portion 22b-1 and adjustable in position relative to the female thread portion 22b-1 in an axial direction of the male thread portion 22b-2. The concave portion 27 is formed in the male thread portion 22b-2.

With this end plate structure, since the first end plate 22A is divided into the end plate main portion 22a and the adjusting portion 22b and one portion 32A of the load variance decreasing mechanism 32 is disposed between the end plate main portion 22a and the adjusting portion 22b, by using a coned disk spring for the load variance decreasing mechanism 32, the point load received at the adjusting portion 22b is spread and transmitted to the end plate main portion 22a. Further, since adjusting portion 22b is constructed of the female thread portion 22b-1 and the male thread portion 22b-2, when the male thread portion 22b-2 is rotated relative to the female thread portion 22b-1, the female thread portion 22b-1 does not rotate, so that a twisting load does not act on the set of coned disk springs 32A between the end plate main portion 22a and the adjusting portion 22b.

The pressure plate 26 is divided into two members: an inboard member 26a and an outboard member 26b in the fuel cell stacking direction, and at least one portion 32B of the load variance decreasing mechanism 32 is disposed between the two members 26a and 26b of the pressure plate 26. The load variance decreasing mechanism 32B includes a plurality of coned disk springs piled on each other.

With the pressure plate structure, the load variance decreasing mechanism 32B is constructed of coned disk springs, the point load received at the contact portion of the convex portion 28 with the concave portion 27 is spread and transmitted to the inboard member 16b.

The convex portion 28 is formed in the outboard member 26b. Further, a load sensor 34 is provided to the outboard member 26b. The load sensor 34 is a strain gauge. A plurality of (for example, four) strain gauges are provided to the member 26b and are arranged at equi-intervals.

With the load sensor 34, since the load sensor 34 is located on the fuel cell side than the contact portion of the convex portion 28 with the concave portion 27, the sensor 34 can measure exactly the loads acting perpendicularly to the cell plane. Further, since the plurality of strain gauges are arranged at equi-intervals, the loads in all directions can be measured.

An outboard corner of the outer portion of the pressure plate 26 is tapered to form a tapered surface 36. Due to this tapered surface 36, the outside surface of the pressure plate 26 has a height $h_1$ in the fuel cell stacking direction smaller than a height $h_2$ of an inside surface in the fuel cell stacking direction of the wall of the electrical insulator 21 defining the recess 33 therein.

With this electrical insulator structure, maintaining a compact structure, the electrical insulation distance (a+b+c in FIG. 20) between the pressure plate 26 and the electrical terminal 20 along the electrical insulator 21 can be large.

The load variance decreasing mechanism 32 includes a set of coned disk springs 32A, 32B which is reversed in taper angle when a fuel cell stacking force acts on the at least one set of coned disk springs 32A, 32B. More particularly, the taper angles of the coned disk springs 32A and 32B when no load acts on the stack of fuel cells illustrated in FIG. 17 are reverse to the taper angles of the coned disk springs 32A and 32B when tightening load acts on the stack of fuel cells illustrated in FIGS. 18 and 19.

Figure 21:
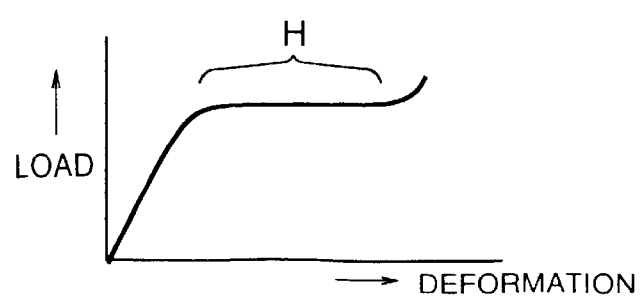
FIG. 21 is a graph illustrating a load versus deformation of a load variance decreasing mechanism (coned disk spring) of the fuel cell apparatus according to the third embodiment of the present invention.

With this load variance decreasing mechanism 32, in the graph of a load versus deformation of FIG. 21, a flat range H is produced at a taper angle reverse point and the vicinity thereof. At that range, the fuel cell tightening load changes little, even if the coned disk springs are largely deformed. By bringing the fuel cell tightening load at this flat range, the stack-tightening load can be stable irrespective of the thermal expansion or shrinkage and creep deformation of the stack of fuel cells.

At least one pair of spring seats 35 is provided to the pressure plate 26 and the end plate 22, for contacting and supporting the set of coned disk springs 32 at a radially inner end and a radially outer end of the set of coned disk springs 32. Each pair of spring seats 35 is inclined at an angle equal to or greater than the reversed taper angle θ of corresponding set of coned disk springs 32 on which the tightening load is loaded.

With this tapered spring seat structure, the coned disk springs 32 and the spring seats 35 line-contacts to each other at contact portions of the coned disk springs 32, i.e., the radially inner portion and the radially outer portion of the coned disk springs 32. The contact portions do not change before and after loading of the tightening load and before and after reverse of the taper angle of the coned disk springs 32. As a result, the tightening load loaded on the stack of fuel cells is stable.

In the fourth to sixth embodiments (FIGS. 22–25) of the present invention, the stack of fuel cells 23 is provided with an attaching member for attaching the fuel cell apparatus to a vehicle to which the fuel cell apparatus 10 is mounted. The attaching member is constructed of a portion of the stack of fuel cells 23 itself.

In the fourth embodiment of the present invention, as illustrated in FIGS. 22 and 23 (illustrating the stack reversely to each other in an up-and-down direction), the fuel cell apparatus 10 is provided with a lower tension plate 24A and an upper tension plate 24B. The attaching member is constructed of the lower tension plate 24A.

The lower tension plate 24A is made of such a rigid material as iron, stainless steel, and engineering plastics. The lower tension plate 24A is provided with an attaching portion 40. As illustrated in FIG. 23, a gap 41 exists between the attaching portion 40 and the pile of modules or fuel cells. A bolt 42 inserted into the gap 41 penetrates the attaching portion 40 and the vehicle side member 43, and cooperating with a nut 44, the bolt 42 attaches the lower tension plate 24A to the vehicle side member 43. As a result, the stack of fuel cells 23 is attached to the vehicle. By attaching the stack of fuel cells 23 to the vehicle at the lower tension plate 24A, the strength of the lower tension plate 24A is increased. Due to this structure, the tension plate which holds a pressure on the fuel cells is strengthened.

Since the lower tension plate 24A constitutes a portion of the stack of fuel cells 23 and attaches the stack to the vehicle side member 43, a special attaching member is not required to be provided and the number of parts is not increased.

The structure of the attaching portion 40 is not limited to the structure extending in the fuel cell stacking direction and can be replaced by other structures.

Further, the attaching structure of the tension plate 24A to the vehicle side member 43 is not limited to the bolt 42 and nut 44 structure, but can be replaced by other structures, for example, a structure where a female thread hole is formed in the lower tension plate 24A and a bolt is threaded into the female thread hold without using a nut.

In the fifth embodiment of the present invention (FIG. 24), the lower tension plate 24A constitutes the attaching member. A recess 45 receding in a direction perpendicular to the fuel cell stacking direction is formed in the stack of fuel cells. A bolt 42 is inserted into a gap 46 formed between the recess 45 and the lower tension plate 24A, and attaches the lower tension plate 24A to the vehicle side member 43. By this structure, using the lower tension plate 24A, the stack of fuel cells 23 can be attached to the vehicle. The tension plate 24A can be replaced by a tension bolt.

In the sixth embodiment of the present invention (FIG. 25), the attaching member is constructed of any one of a supply or an exhaust pipe for supplying or exhausting the reactant gas or coolant to or from the stack of fuel cells, and the separator and/or the end plates of the stack of fuel cells. More particularly, the stack of fuel cells 23 is attached to the vehicle side member 43 by the supply or exhaust pipe 47 for supplying or exhausting the reactant gas or coolant to the fuel cells and by at least one portion (a separator used for attachment) of the separators 18. The separator used for attaching may have a configuration different from other separators. For example, only the separator used for attachment may be increased in thickness, whereby increase in the entire length of the stack of fuel cells is suppressed.

Though in the fourth to sixth embodiments of the present invention the attaching member includes any one of the lower tension plate 24A, the end plate 22, the supply or exhaust pipe 47, and the separator 18, the attaching member is not limited to those members, and may constructed of other members constituting a portion of the stack of fuel cells 23.

According to the present invention, the following technical advantages are obtained:

Since the end plate 22 and the tension plate 26 is pressed to each other at the contact portion of the convex portion 28 and the concave portion 27, even if the fuel cells are not exactly parallel with each other, the end plate 22 can press at a point the pressure plate 26 at the contact portion of the convex portion 28 and the concave portion 27 so that the pressure plate can press the stack of the fuel cells 23 at an evenly distributed pressure over the entire transverse cross-sectional area of the stack of fuel cells. Further, since the convex portion 28 is formed in the pressure plate 26, the variance in parallel between fuel cells can be absorbed by rotation or tilting of the pressure plate 26 about the center of curvature of the curved surface of the convex portion 28 without being accompanied by dislocation of the fuel cells in a direction perpendicular to the fuel cell stacking direction. Furthermore, since the concave portion 27 is formed in the end plate 22, the convex portion 28 and the concave portion 27 do not dislocate relative to each other in the transverse direction perpendicular to the fuel cell stack direction and the coupling is stable.

In the case where the end plate 22 and the fastening member 24 is coupled by a serration 29 and a bolt 25, no slippage occurs between the end plate 22 and the fastening member 24. As a result, a diameter of a thread hole formed in the end plate 22 for receiving the bolt 25 can be small and a thickness of the end plate 22 can be small. As a result, an entire length of the stack of the fuel cells can be decreased.

In the case where the adjusting portion 22b is provided, a positional adjustment of an amount smaller than one pitch of the serration teeth is possible.

In the case where the load variance decreasing mechanism 32 is provided, even if the load varies due to the thermal expansion and shrinkage and the creep deformation of the stack of fuel cells, the variance in the load loaded on the stack of fuel cells 23 is suppressed.

In the case where a recess 33 is formed in the electrical insulator 21, the electrical insulation distance along the outside surface of the electrical insulator 21 between the pressure plate 26 and the electrical terminal 20 is long, so that the electrical insulation is improved.

In the case where the curved surface of the convex portion 28 is a spherical surface, the pressure on the fuel cell can be even in all directions.

In the case where dislocation of the fuel cells is restricted by the fastening member, the curved surface of the convex portion 28 may be replaced by a cylindrical surface and a similar advantage to that of the spherical surface can be obtained.

In the case where the load variance decreasing mechanism 32 is provided, the load variance decreasing mechanism 32 can absorb a thermal expansion and/or shrinkage and a creep deformation of the stack of fuel cells. When the load variance decreasing mechanism 32 is constructed of a coned disk spring, the coned disk spring can spread the load and transmit the load to the end plate 22 and the pressure plate 26. When the load variance decreasing mechanism 32 is constructed of a plurality of sets of springs arranged in series with each other and the contact portion is disposed between the plurality of sets of springs, the load from the contact portion can be spread and transmitted to the end plate 22 and the pressure plate 26.

In the case where the first end plate 22A is constructed of the end plate main portion 22a and the adjusting portion 22b and at least one set of coned disk spring 32A is disposed between the portions 22a and 22b, the load received at the adjusting portion 22b can be spread and transmitted to the end plate main portion 22a. Since the adjusting portion 22b includes the female thread portion 22b-1 and the male thread portion 22b-2, no twisting force acts on the coned disk spring 32A, because the female thread portion 22b-1 is restricted in rotation.

In the case where the pressure plate 26 is divided into tow members 26a and 26b and a set of coned disk springs 32B is disposed between the two members 26a and 26b, the load received at the member 26b can be spread and transmitted to the other member 26a.

In the case where the load sensor 34 is provided to the member 26b, since the load sensor 34 is located on the side closer to the fuel cells than the contact portion of the convex portion 28 with the concave portion 27, the sensor 34 can measure exactly the force acting perpendicular to the fuel cell plane.

In the case where the height of the side of the pressure plate 26 is smaller than the height of the recess of the electrical insulator 21, the electrical insulation length along the surface of the electrical insulator 21 can be long and a good electrical insulation is obtained.

In the case where the taper angle of the coned disk spring is reversed when a tightening load is loaded on the stack of fuel cells 23, a flat range is obtained in the load versus deformation graph of the coned disk spring, and by using the coned disk spring at the flat range, the tightening load of the stack of fuel cells is stable.

In the case where the spring seat 35 for supporting the coned disk spring is provided with an taper angle greater than that of the reversed coned disk spring, the spring seat 35 and the coned disk spring line-contacts at the constant portion of the coned disk spring, so that the tightening load loaded on the fuel cells is stable irrespective of the thermal expansion or shrinkage and creep deformation of the stack of fuel cells.

In the case where the stack attaching member is constructed of a portion of the fuel cell stack itself, it is not necessary to provide an extra attaching member used only for attaching the stack of fuel cells to a vehicle, so that attaching the stack of fuel cells to the vehicle by a small number of attaching members is possible.

In a case where the fuel cell stack is attached to the vehicle by the attaching member constituting a portion of the fuel cell stack, it is not necessary to provide an extra attaching member used only for attaching the fuel cell stack to the vehicle, so that attaching the fuel cell stack to the vehicle with a small number of attaching members becomes possible, which suppress the increase in attaching works and in the weight.

The foregoing description of the embodiments of the present invention provides illustration and description, but is not intended to be exhaustive or to limit the invention to the precise form disclosed. Modification and variation are possible consistent with the above teachings or may be acquired from practice of the invention. For example, the various features of the invention, which are described in the contexts of separate embodiments for the purposes of clarity, may also be combined in a single embodiment. Conversely, the various features of the invention which are, for brevity, described in the context of a single embodiment may also be provided separately or in any suitable sub-combination. Accordingly, it will be appreciated by persons skilled in the art that the present invention is not limited to what has been particularly shown and described hereinabove. Rather, the scope of the present invention is defined only by the attached claims and their equivalents.

What is claimed is:

1. A fuel cell apparatus comprising:
   a stack of fuel cells having a fuel cell stacking direction and a first end and a second, opposite end in the fuel cell stacking direction;
   first and second end plates disposed on the first end and the second end of said stack of fuel cells, respectively, said first and second end plates pressing said stack of fuel cells therebetween and being connected by a fastening member extending in the fuel cell stacking direction outside said stack of fuel cells, said first end plate having an inboard surface facing said stack of fuel cells; and
   a pressure plate disposed on a side of said first end of said stack of fuel cells and inboard of said first end plate, said pressure plate having an outboard surface facing said first end plate,
   wherein said first end plate has a concave portion formed in said first end plate at said inboard surface of said first end plate, and said pressure plate has a convex portion having a curved surface formed in said pressure plate at said outboard surface of said pressure plate, said convex portion contacting said concave portion.

2. A fuel cell apparatus according to claim 1, wherein each of said first and second end plates is coupled to said fastening member by a serration and a bolt.

3. A fuel cell apparatus according to claim 1, wherein said first end plate includes an end plate main portion and an adjusting portion adjustable in position relative to said end plate main portion in said fuel cell stacking direction, said concave portion being formed in said adjusting portion.

4. A fuel cell apparatus according to claim 1, wherein a load variance decreasing mechanism is disposed at at least one position of in said first end plate, in said pressure plate, and between said pressure plate and said first end plate, and in series with a contact portion of said convex portion with said concave portion in a tightening force transmitting direction.

5. A fuel cell apparatus according to claim 4, wherein said load variance decreasing mechanism comprises a plurality of sets of coned disk springs, disposed in series with each other.

6. A fuel cell apparatus according to claim 4, wherein said first end plate includes an end plate main portion and an adjusting portion adjustable in position relative to said end plate main portion in said fuel cell stacking direction, at least one portion of said load variance decreasing mechanism being disposed between said end plate main portion and said adjusting portion, said adjusting portion including a female thread portion restricted in rotation relative to said end plate main portion and a male thread portion threaded to said female thread portion and adjustable in position relative to said female thread portion in an axial direction of said male thread portion.

7. A fuel cell apparatus according to claim 4, wherein said pressure plate is divided into two members in said fuel cell stacking direction, and at least one portion of said load variance decreasing mechanism is disposed between said two members of said pressure plate.

8. A fuel cell apparatus according to claim 4, wherein said load variance decreasing mechanism includes at least one set of coned disk springs which is reversed in taper angle when a fuel cell stacking force acts on said at least one set of coned disk springs.

9. A fuel cell apparatus according to claim 8, further comprising at least one pair of spring seats, provided to at least one of said pressure plate and said end plate, for contacting and supporting said at least one set of coned disk springs at a radially inner end and a radially outer end of said at least one set of coned disk springs, each of said at least one pair of spring seats being inclined at an angle equal to or greater than the taper angle of corresponding said at least one set of coned disk springs reversed in taper angle.

10. A fuel cell apparatus according to claim 1, further comprising an electrical insulator disposed inboard of said pressure plate, and wherein said electrical insulator has an outboard surface and a recess formed in said electrical insulator at said outboard surface of said electrical insulator, said pressure plate being disposed in said recess of said electrical insulator.

11. A fuel cell apparatus according to claim 10, wherein said pressure plate includes an outside surface having a height in said fuel cell stacking direction smaller than a height of an inside surface in said fuel cell stacking direction of said recess formed in said electrical insulator.

12. A fuel cell apparatus according to claim 1, wherein said curved surface of said convex portion comprises a spherical surface.

13. A fuel cell apparatus according to claim 1, wherein in a case where said fuel cells are restricted in dislocation in one of two directions perpendicular to said fuel cell stacking direction by said fastening member, said curved surface of said convex portion can comprise a cylindrical surface curved in the other direction of said two directions in which said fuel cells are not restricted in dislocation by said fastening member.

14. A fuel cell apparatus according to claim 1, wherein said pressure plate is divided into two members including an outboard member and an inboard member in said fuel cell stacking direction, said outboard member having said convex portion formed therein and a load sensor provided therein.

15. A fuel cell apparatus according to claim 1, including an attaching member for attaching said fuel cell apparatus to a vehicle to which said fuel cell apparatus is mounted, said attaching member being constructed of a portion of said fuel cell apparatus itself.

16. A fuel cell apparatus according to claim 15, wherein said attaching member is said fastening member connecting said first and second end plates.

17. A fuel cell apparatus according to claim 16, wherein said attaching member has an attaching portion protruding in a direction away from said stack of fuel cells and in a direction perpendicular to said fuel cell stacking direction, said attaching member being attached to the vehicle at said attaching portion.

18. A fuel cell apparatus according to claim 17, wherein said stack of fuel cells has a recess receding from a surface of said stack of fuel cells in said direction perpendicular to said fuel cell stacking direction, and said attaching member has an attaching portion at a position corresponding to said recess, said attaching member being attached to the vehicle at said attaching portion.

19. A fuel cell apparatus according to claim 15, wherein said attaching member is any one of said first and second end plates and a separator of said fuel cell.

20. A fuel cell apparatus according to claim 15, wherein said attaching member is a member for supplying reactant gas or coolant to said fuel cell apparatus.

* * * * *